UNITED STATES PATENT OFFICE.

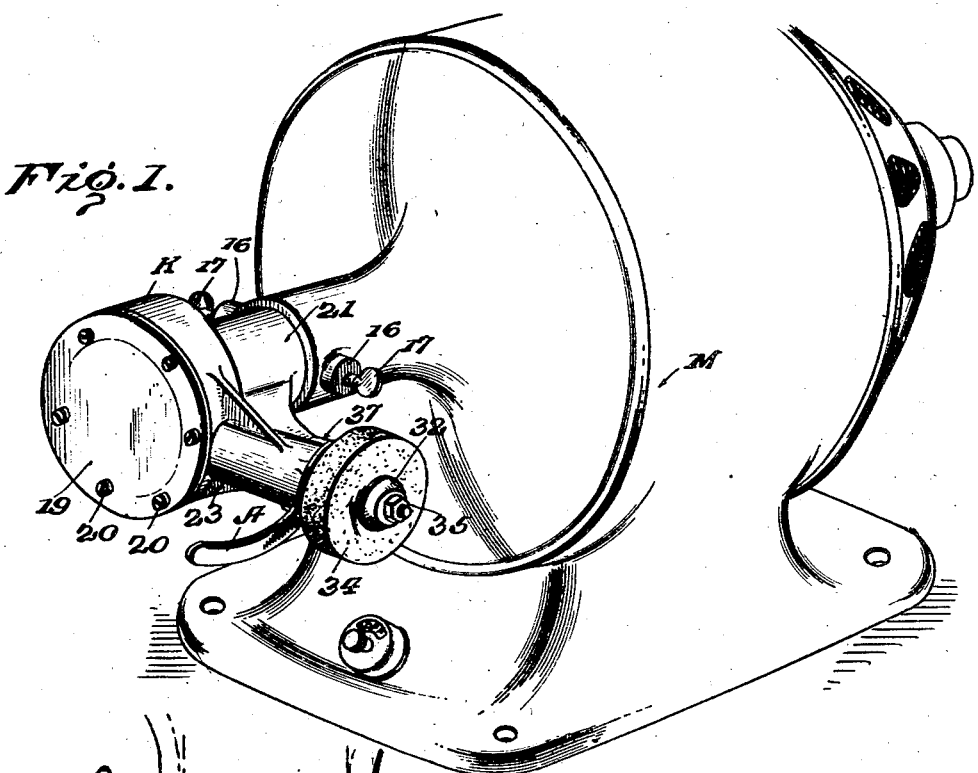

ANDREW GEORGE BLOCKER, OF ST. LOUIS, MISSOURI.

ATTACHMENT FOR MOTOR-DRIVEN DEVICES.

1,417,228.   Specification of Letters Patent.   Patented May 23, 1922.

Application filed June 27, 1921. Serial No. 480,651.

*To all whom it may concern:*

Be it known that I, ANDREW GEORGE BLOCKER, a citizen of the United States, and a resident of St. Louis, in the State of Missouri, have invented certain new and useful Improvements in Attachments for Motor-Driven Devices, of which the following is a specification.

My invention relates to devices of the motor operated type, for instance motor driven meat grinders and the like, and the purpose of my invention is the provision of an attachment therefor by means of which it is converted into a grinding device for the sharpening of butcher's implements or the like.

It is also a purpose of my invention to provide an attachment for meat grinders in which the rotational speed of the grinder is materially increased and delivered in such a manner as to allow of the operation of various devices other than tool sharpeners.

I will describe one form of meat grinder and one form of attachment therefor embodying my invention and will then point out the novel features thereof in claims.

In the accompanying drawings:

Figure 1 is a view showing in perspective a conventional form of motor operated meat grinder modified to accommodate and having applied thereto one form of attachment embodying my invention.

Figure 2 is a horizontal sectional view of the attachment shown in Figure 1 with a portion of the motor driven device in section to show the manner in which the attachment is connected to the grinder.

Similar reference characters refer to similar parts in each of the views.

In the present instance the meat grinder includes a motor designated at M, the casing of which is formed with a barrel or tubular extension B which is adapted to rotatably receive the armature shaft designated at E. As shown in Figures 1 and 2, the shaft E is formed with a socket 15, and the adjacent end of the barrel B is formed at diametrically opposite points upon its outer side with bosses 16 provided with threaded bores to accommodate locking screws 17.

The attachment forming the subject matter of my invention comprises a casting designated generally at K and includes a gear casing 18 having an open side closed by a cover 19 secured thereon by screws 20. Extending from one side of the gear casing is an extension 21 bored longitudinally to provide a bearing for a shaft 22. At the periphery of the gear casing 18 a sleeve extension 23 is provided which forms a bearing for a shaft 24. For securing the casting as a unit upon the barrel B of the meat grinder the extension 21 is provided with a collar 25 that surrounds the socket 15 and has a snug fit within the barrel B. The collar is securely retained within the barrel by means of the screws 17, the collar being formed at diametrically opposite points with recesses 25ª for the accommodation of the pointed ends of the screws.

As shown in Figure 2, the shaft 22 is formed at one end with a polygonal shaped head 22ª adapted to fit within the socket 15, the latter being of a corresponding shape to prevent rotation of the head within the socket. Adjacent the head 22ª the shaft is provided with a washer 26 adapted to contact with ball bearings 27 working within a suitable raceway formed in the extension 21. The opposite end of the shaft 22 is screw threaded to receive a nut 28, this end of the shaft projecting into the gear casing 18. At this point the shaft 22 is provided with a relatively large beveled gear 29 that is keyed or otherwise suitably fixed to the shaft for rotation therewith. The gear 29 meshes with a beveled pinion 30 fixed on the adjacent end of the shaft 24. The opposite end of the shaft 24 projects from the sleeve extension 23 and is there provided with a reduced extension 31 threaded to receive a disc 32 that cooperates with a similar disc 33 mounted on the extension 31 for securing a grinding wheel 34 thereon. The disc 32 is secured against displacement from the extension 31 by means of a nut 35 so that after the disc has been adjusted to clampingly embrace the wheel 34 the nut is applied and when screwed into contact with the disc prevents rotation of the latter.

When the attachment is applied rotation of the motor shaft E effects rotation of the shaft 22 through the medium of the head and socket connection. By rotating the shaft 22, the shaft 24 is rotated at a much greater rate of speed through the medium of the gears 29 and 30, and with a grinding wheel 34 applied to the extension 31 in the manner previously described, it will be clear that rapid rotation of such wheels is effected. The grinding wheel 34 is preferably provided for the purpose of sharpening butchers' implements such as knives, cleavers and the like, and to this end I have provided an implement supporting arm designated at A which is supported adjacent the wheel to allow of the reposing of the implements thereon during the sharpening operation. As shown in Figure 1, the arm A is curved longitudinally to permit of the supporting of implements at various levels with respect to the periphery of the grinding wheel. As shown in Figure 2, the arm A is pivotally secured upon the casting K by means of a screw 36 so that it can be swung upwardly and rearwardly from the active position shown to an inactive position. For firmly supporting the arm in active position it is provided with a semi-circular curve 37 which conforms to the contour of the sleeve extension 23 so that when an implement is resting upon the arm its curved portion will bear against the extension 23 and thus relieve the screw 36 of this undue strain.

It is of course to be understood that the grinding wheel 34 can be displaced by other devices such as beaters, drills or polishing wheels so that the latter can be operated in the same manner by the meat grinder to perform various forms of work.

Although I have herein shown and described only one form of meat grinder and one form of attachment therefor embodying my invention, it is to be understood that various changes and modifications may be made herein without departing from the spirit of the invention or the spirit and scope of the appended claims.

What I claim is:

1. An attachment for motor driven devices of the class described having a casing including a barrel receiving the shaft of the motor, said attachment comprising a casting adapted to be detachably secured to the barrel and having angularly disposed bearings, a shaft journaled in one bearing and adapted to be operatively connected to the motor shaft for rotation therewith, a second shaft journaled in the other bearing, gears operatively connecting the two shafts, said casing having an enlarged hollow portion between its said bearings, forming a housing for said gears and open at one side, a detachable cover plate normally closing said housing, and an element adapted to perform work when rotated, said element being secured to the second mentioned shaft for rotation therewith externally of the casing.

2. In an attachment of the character described including a rotatable working element and a bearing support at one side of said element, a work support consisting of an arm disposed parallel to and spaced from the plane of rotation of the working element and having a free end at one side of the said bearing support, said work supporting arm being pivotally connected at its opposite end to the bearing support at the opposite side of the latter whereby it may be shifted on the pivot into and out of active position, and said arm having a curved portion adjacent to its pivoted end which rests upon the bearing support in the active position of the supporting arm as described.

ANDREW GEORGE BLOCKER.